United States Patent Office 3,153,471
Patented Oct. 20, 1964

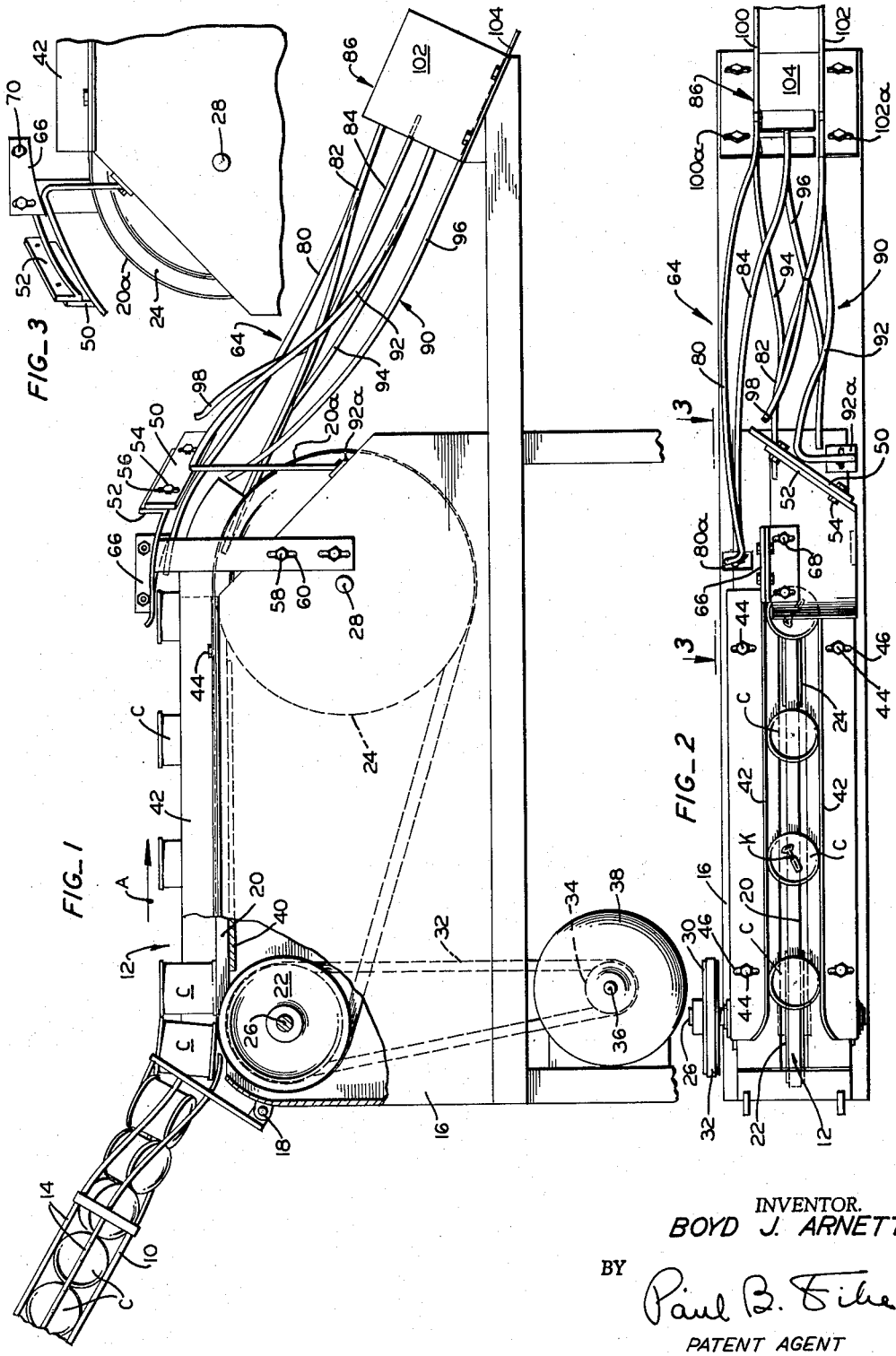

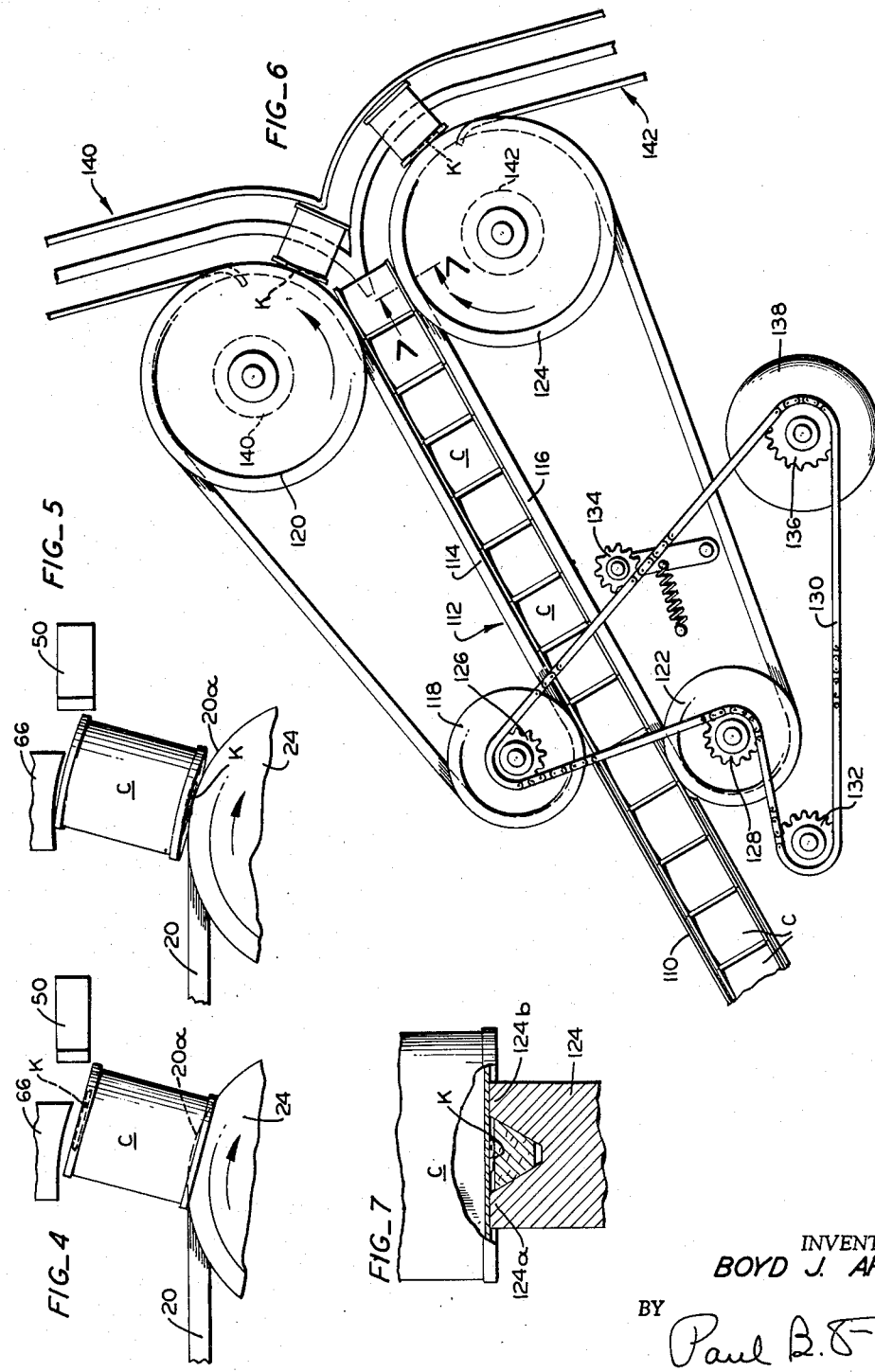

3,153,471
APPARATUS FOR DETECTING, SORTING AND ORIENTING ARTICLES
Boyd J. Arnett, 1914 Monroe St., Santa Clara, Calif.
Filed Jan. 24, 1958, Ser. No. 711,034
2 Claims. (Cl. 198—31)

The present invention relates generally to the art of article detection, and more particularly, to apparatus for detecting the presence or absence of articles or certain portions or characteristics thereof, and for subsequently sorting and/or orienting the articles in accordance with the results of such detection.

Various mechanical, electrical and magnetic detecting devices are employed for the handling of a very wide variety of articles in order to ascertain certain characteristics thereof, usually for the purpose of instigating subsequent operations on the article or series of articles. The apparatus to be described hereinafter was developed for the handling of the conventional "tin can" used for the commercial packaging of foodstuffs and other perishable items, such cans presenting peculiar problems for any detecting apparatus. Cans of this type vary in size and configuration, but in most instances, a rim or lip protudes beyond the end closure element of the can, wherefore, it is necesary, if, for example, the absence or presence of such end element or an attached can-opening key is to be ascertained, that the article-sensing member enter the space between the opposite sides of the rim to effect the detection. This peculiar problem of detection is not simplified by the fact that can handling machinery usually operates at relatively high speeds, a rate of 500 cans per minute or more being not uncommon. Additionally, sorting, orienting or other operations performed on the cans and instigated by the detection device must be carried out at this high rate of speed smoothly without interruption so that jamming and possible injury to the cans is precluded.

Accordingly, it is a general object of the present invention to provide an improved apparatus for the detection of articles or certain characteristics thereof and for the subsequent correlated sorting, orienting or other handling of the articles in an effective and positive manner, even though the articles be moved through the apparatus in rapid succession.

It is a feature of the invention to provide an apparatus embodying the general object set forth immediately above and which furthermore, can be adjusted so that cans or other articles of various shapes and sizes can be accommodated therein.

A further feature of the invention is the provision of a simple arrangement for controlling the quantity of articles handled by the detecting, sorting, and orienting apparatus in a given period of time, wherefore its "throughput" can be readily adjusted, even during operation of the apparatus.

An extremely important feature of the invention, and specifically directed to the detection apparatus itself is the arrangement thereof in a manner such that certain elements or characteristics of an article disposed within a recessed portion thereof, such as a can-opening key mounted on the recessed end of a can, are made available to detection.

In accordance with one aspect of the invention, a shape characteristic of the article is detected by mechanical means involving no moving parts other than the article conveyor itself, thus obviating false detection as a result of power failure or breakdown of a moving part.

In accordance with another aspect of the invention, a magnetic element is incorporated as part of the detection apparatus so that not only changes in shape but changes in the magnetic characteristic of the article can be detected to thereafter initiate sorting, orienting or other operations.

These and other objects and features of the invention will become more apparent from a perusal of the following description of the accompanying drawings, wherein:

FIG. 1 is a fragmentary, side elevational view of an apparatus which can be utilized for detecting the key end of each of a plurality of cans moving therethrough and for subsequently sorting and orienting those cans, the apparatus constituting one embodiment of the invention, FIG. 2 is a top plan view of the structure illustrated in FIG 1, FIG. 3 is a fragmentary view of a can deflecting structure constituting part of the apparatus illustrated in FIGS. 1 and 2 and viewed in the direction of the arrows 3—3 of FIG. 2, FIGS. 4 and 5 are two similar views diagrammatically illustrating the detection operation, FIG. 6 is a top plan view of a second embodiment of the invention wherein a magnetic detection mechanism is employed, and FIG. 7 is a fragmentary sectional view taken along line 7—7 in FIG. 6.

As illustrated in FIGS. 1 and 2, the first embodiment of the invention is arranged to receive generally cylindrical cans each having a key attached thereto at one end. The apparatus is arranged to detect the key position; and thereafter, in accordance with the results of such detection, to sort the cans for subsequent movement along one or the other of two paths which subsequently merge after a relative rotation of the sorted cans of precisely 180° is effected so that the can are delivered to a discharge chute in oriented alignment. It is to be expressly understood that this is merely an exemplary utilization of the apparatus, and other applications thereof will be indicated hereinafter.

The cans, generally indicated at C, and having a key K at one end thereof, are arranged to roll down an inclined feed chute 10 onto a conveyor, generally indicated at 12. The feed chute 10 is of known construction consisting of four rods 14 arranged to laterally encompass and engage the cans C at four spaced points. Immediately prior to their termination, the rods 14 of the chute 10 are bent so as to effect a twisting of the cans C through an angle of 90° wherefore each can is, in turn, delivered to the conveyor in substantially an axially upright position, as best shown in FIG. 1.

The described feed chute 10 is secured to one end of the frame 16 that provides support for the conveyor 12, and as indicated at 18 in FIG. 1, such connection is an adjustable one so that the angle of inclination of the chute 10 can be varied. Depending upon the setting of the inclination of the feed chute 10, the cans C delivered to the conveyor 12 will be spaced a predetermined amount one from the other. As each can C moves into its inclined disposition at the end of the feed chute 10 to its axially upright position on the conveyor 12, the rearward upper edge thereof will restrain movement of the succeeding can C onto the conveyor until it has moved a predetermined distance on the conveyor, thus determining the spacing between successive cans, as is clearly illustrated in FIG. 1. If the angle of inclination of the feed chute 10 is made greater, it will be obvious that each can on the conveyor 12 will hold its successor at the exit of the chute for a longer period of time and thus the spacing between succeeding cans will be increased. Thus, by the simple expedient of adjusting the angle of inclination of the feed chute 10, the spacing of the cans on the conveyor 12 can be varied, and since the conveyor moves at a constant speed, as will be described in detail hereinafter, the quantity of cans passing through the apparatus in a given time, that is, the throughput of the apparatus, can be varied. Furthermore, it will be apparent that such adjustment can take place during operation of the apparatus.

The aforementioned conveyor 12 preferably consists of an endless belt 20 trained about spaced pulleys 22, 24 of predetermined diameter and supported on parallel shafts 26, 28 respectively, so that the upper flight of the belt extends from the exit end of the delivery chute. This flight of the belt 20 is shown as substantially horizontal, but can be considerably inclined, if desired. To effect movement of the conveyor belt 20, a drive pulley 30 is attached to one end of the first shaft 26 to engage a drive belt 32 that is also trained around a pulley 34 mounted on the shaft 36 of a motor 38 supported under the conveyor 12 on the frame 16 of the apparatus.

The underside of the conveyor belt 20 during its upper can-carrying flight is encompassed within a longitudinal belt guide 40 rigidly supported by the frame 16. Also supported by the frame 16 in spaced parallelism to the belt 20 are can guides 42 which maintain the cans in file relation during their conveyance by the belt. These can guides 42 are attached to the frame 16 by bolts 44 that extend through slots 46 in the guides 42, such slots 46 extending at right angles to the direction of travel of the conveyor belt, wherefore the guides 42 can each be laterally adjusted to accommodate cans of varying diameter.

The described drive motor 38 rotates in a clockwise direction so that the pulleys 22, 24 supporting the conveyor belt 20 also rotate in a clockwise direction and the upper flight of the belt moves from left to right, as viewed in FIGS. 1 or 2. Thus, cans C fed onto the conveyor belt 20 from the feed chute 10 move in the direction of the arrow A in FIG. 1, eventually arriving at a position over the arcuate section 20a of the conveyor belt 20 as it follows the periphery of the second pulley 24.

As can best be seen by reference to FIG. 2, the transverse dimension of the belt 20 is substantially less than that of the cans C carried thereby, and the circumference of the second pulley 24 is predetermined such that the arcuate belt section 20a following the pulley periphery has a degree of curvature permitting it to project between the diametrically opposite portions of the can rim so as to engage the recessed end member thereof, as clearly illustrated in FIG. 4. This presentation of the can C in abutting relationship to a can-engaging means in the form of a curved or arcuate member adapted to project into the space between opposite portions of the rim or edge of the can, or other article for that matter, constitutes the general mechanism for the detection of certain characteristics of an article in accordance with the present invention.

In the embodiment of the invention disclosed in FIGS. 1 through 5, the detection of a can-opening key K constitutes the illustrated exemplary application, as previously mentioned. More particularly, the presence or absence of a key K at the belt-supported end of the can C is the precise characteristic to be determined or detected. If a key K is absent from the belt-supported end of a can C, the can will ride along the rectilinear flight of the conveyor belt 20 between the two pulleys 22, 24 in an axially, upright position with its opposite rim portions in engagement with the belt, but upon arrival at the arcuate section 20a of the belt where it passes around the second pulley 24, the belt can enter into the space between the rim portions of the can so as to engage its end member, as illustrated in FIG. 4. The can C thus "settles" down onto the arcuate section 20a of the moving conveyor belt 20.

On the other hand, if a key K is present at the belt-supported end of the can C, such "settling" of the can as it passes over the arcuate belt section 20a, cannot occur. As in the above described instance, the can C is supported on its opposite rim portions during its travel along the rectilinear flight of the belt 20 between the two pulleys, it being understood that the thickness of the key K itself is less than the amount of recession of the can end member from the projecting rim thereof. However, when the can C arrives at a position over the arcuate belt section 20a, the belt moves away from the foremost rim portion of the can engaging only the key and the rearmost rim portion. The can C, therefore, not only fails to settle over the curved belt section to the degree experienced when no key K is present, but tilts relatively rearwardly, as clearly shown in FIG. 5. Ultimately then, a can C with a key K disposed at its belt-supported end is displaced further from the axis of rotation of the pulley 24 during its movement over the arcuate belt section 20a than is a can having no key at its supported end, and additionally, a can with the key present at its supported end is tilted relatively rearwardly from its general direction of motion more than a can with no key present at its supported end, and the described structure providing this relative displacement of each can in accordance with the presence or absence of a key at its supported end constitutes a simple exemplary form of detecting means embodying the present invention.

In the structure disclosed in FIGS. 1 through 5, this relative displacement of each can C in accordance with the absence or presence of a key K at one end thereof is thereafter utilized to instigate sorting of the cans; those cans with the key positioned at the lowermost end being deflected for traversal of one path, while those having the key at their uppermost end are not so deflected and continue along a second predetermined path. In order to provide such deflection, a deflector bar 50 is supported to extend angularly across the can path in spaced relation to the can-supporting conveyor belt 20. The deflector bar 50 is supported from a bracket 52 attached to the side of the machine frame 16 by means of bolts 54 passing through slots 56 in the bar so that it may be both adjusted towards or away from the can path and angularly relative thereto. The supporting bracket 52, in turn, is supported for relative vertical adjustment on the frame 16 by bolts 58 extending through slots 60 so that larger adjustment of the deflector bar 50 relative to the can path can be made when the length of can handled by the apparatus is to be changed. Quite obviously, adjustment is made so that the deflector bar 50 will engage the leading upper portion of the can C having its key end in engagement with the belt 20 so as to deflect the same, as diagrammatically illustrated in FIG. 5, while remaining far enough away from the conveyor belt so that cans, having no key at the belt-supported end which settles down on the belt, as previously described, can pass freely thereunder without deflection, as diagrammatically shown in FIG. 4.

The action of the deflector bar 50, when a can C comes into engagement therewith, is to deflect the upper end of the can to the left, as viewed in the direction of can motion through the apparatus, so that the can is ultimately moved into a twist chute 64, to be described hereinafter, and which defines the first of the aforementioned can paths, with the can axis decidedly tilted. In order to initiate such tilting, preferably a curved can-engaging member 66 is positioned above the can path and toward that side whereat deflected cans are to be shifted by the described deflector bar 50. Like such deflector bar 50, this can-engaging member 66 is mounted on the frame 16 for lateral and vertical adjustment relative to the can path by slotted connecting means indicated at 68 and 70, respectively, so that the desired tilting action may be obtained with precision and so that different size cans may be accommodated when required. Generally, this can-engaging member 66 is positioned toward the entrance end of the apparatus relative to the described deflector bar 50, but still lies over the arcuate section 20a of belt 20 at the beginning of its travel around the second pulley 24. The can-engaging member 66 is adjusted so that it will only engage a can C whose key K is at the lower end and comes into engagement with the belt as it moves in its arcuate path while allowing cans with the key in uppermost position to pass freely thereunder in a manner similar to that described with respect to the deflector bar 50. Consequently, a can C with its key end lowermost and in engagement with the conveyor belt 20 will have a lateral portion of its upper rim engaged by the can-engaging member 66 so that a slight tilting thereof is initiated prior to engagement of the can C with the previously described deflector bar 50. This initial tilting of the can C previous to its engagement with the deflector bar 50 serves two purposes. First, it tends to lift the side of the can C remote from the can-engaging member 66 so that subsequent engagement with the deflector bar 50 is rendered more positive, and secondly, it initiates the tilting of the can which is subsequently completed by the can-deflecting engagement with the deflector bar, wherefore a smooth transition of the can C from its upright position on the belt 20 on one tilted decidedly to the left for entry into the twist chute 64 is facilitated. As a result, no jamming or injury to the cans will be experienced during the transfer from the belt 20 to the chute 64.

The twist chute 64, as previously mentioned, defines the first path along which cans C may proceed after passage through the described detection mechanism, only those cans C, whose key K was at the belt-supported end thereof and were consequently deflected by the described deflector bar 50, being conveyed through this chute. Preferably, as shown, this twist chute 64 is formed by three rods, two of which, indicated at 80 and 82, are adapted to engage the opposite ends of each can C and the third 84, one side of the can. All three rods 80, 82, 84 decline from a position adjacent the can deflector bar 50 in a gradual spiral configuration to terminate at the entrance end of a can discharge chute 86, the configuration being such that the axially upright cans C on the conveyor belt 20, after being tilted slightly for entry into the twist chute 64, as previously described, are, during their conveyance gravitationally therealong, turned or twisted further so that they arrive at the exit end of the twist chute 64 with their axes in substantially a horizontal disposition. In short, a relative twisting of precisely 90° is effected.

For those cans C which are carried by the conveyor belt 20 with the key K in uppermost position, wherefore the cans do not engage the deflector bar 50 and thus pass freely thereunder, a second twist chute 90 defining the mentioned second path for cans is provided. This twist chute 90 is generally similar in structure to the described first twist chute including three rods, two of which, indicated at 92 and 94, engage the cans endwise while the third, 96, engages one side thereof. The chute 90 extends from a position adjacent the deflector bar 50, but spaced laterally from the entrance end of the first twist chute 64, along a declining spiral path terminating at the described can-discharge chute 86 directly underneath the discharge end of the first twist chute 64. Undeflected cans C from the conveyor belt 20 are twisted 90° to the right relative to the direction of can motion during their transit of the second twist chute 90. As a consequence, the cans C emerging from both of the twist chutes 64 and 90 will have their axes in substantially a horizontal position and furthermore will be oriented in the same direction; that is, the keys K on all of the cans C will be positioned at the identically disposed ends thereof. To provide initial impetus for the tilting of cans to the right on their entry into the second twist chute 90, a short rod 98 is positioned to deflect an entering can to the right at its uppermost end, as can best be visualized by reference to FIG. 2.

The side-engaging rods 84 and 96 of both chutes 64 and 90 are fixedly secured to the discharge chute 86 and to the machine frame 16 at their opposite extremities.

The end-engaging rods 80, 82, 92 and 94 are also connected at their respective extremities to the apparatus frame 16 and the discharge chute 86, but such connections are made adjustable so that cans of various lengths can be accommodated therein. The end-engaging rods 80, 92 that are adapted to engage the top end of a can as it enters one or the other of the twist chutes 64, 90 are secured to the apparatus frame 16 for limited vertical adjustment, as shown at 80a and 92a, to thus enable the accommodation of cans of various height; thus the other end-engaging rods 82, 94 can be fixedly attached to the apparatus frame 16 at this end without need for adjustment. However, at their opposite extremities, the end-engaging rods 80, 94 and 82, 92, respectively, are connected to the sides 100, 102 of the discharge chute 86 which sides are provided with slotted connection to the apparatus frame, as indicated at 100a and 102a, whereby those sides and the rods 80, 94, 82 and 92 connected thereto can be moved laterally, wherefore, cans C of varied length can be accommodated. Since the chutes 64, 90, each consist of only three rods, cans C of various diameter can obviously be accommodated without adjustment.

The discharge chute 86 consists of the aforementioned adjustable sides 100, 102 and a suitable bottom 104 along which the cans C discharged from the two twist chutes 64, 90 may roll for ultimate delivery to a packing or other can-processing station.

The entire operation of the apparatus shown in FIGS. 1 through 5 can now be described. Initially, the drive motor 38 is energized to effect motion of the conveyor belt 20, that is normally arranged to move at approximately 230 feet per minute to accordingly provide a maximum throughput of cans of approximately 500 cans per minute. As previously mentioned, the quantity of production can be adjusted from the described maximum downwardly by the simple adjustment of the inclination of the feed chute 10. It will, of course, be understood that a certain minimum inclination is absolutely essential so that a minimum spacing between successive cans C on the conveyor belt 20 is obtained to thus preclude interference of one can with another when it passes through the detection mechanism.

After the inclination of the feed chute 10 has been suitably adjusted, cans C are placed therein in a relatively haphazard fashion so that the key end may face in one direction or the other, as illustrated clearly in FIG. 1 of the drawings. The cans C move by gravity down the inclined feed chute 10, being twisted as they move towards the exit thereof and onto the conveyor belt 20 along which the cans are then successively conveyed in axially, upright and spaced positions, again as shown in FIGS. 1 and 2. During their conveyance along the belt 20, the sides of the cans C are lightly engaged by the can guides 42 so that they are confined to a rectilinear path that extends substantially horizontally to the entrance end of the detection mechanism. Thus, each can C arrives at the detection mechanism in the same general disposition, the only difference between successive cans C being the disposition of the key K at the uppermost or lowermost end thereof.

If the key K is positioned at the uppermost end of the can C, the can settles down on the arcuate section 20a of the conveyor belt 20 as it passes around the second pulley 24 wherefore the can C passes freely under the curved can-engaging member 66 as well as the deflector bar 50 so that it is conveyed without hindrance directly into the second twist chute 90. As the can C moves into this twist chute 90, its upper side portion is engaged by the short deflecting rod 98 to provide initial impetus for the can to tilt to the right, as viewed in the direction of its travel, whereupon the can C continues to tilt by gravity and moves along the twist chute 90 with a controlled twisting thereof for eventual delivery from such twist chute into the described discharge chute 86 and through this chute to the packing or other processing station.

If, on the other hand, the can C entering the detection mechanism is disposed with its key end lowermost, then the can C, as it moves over the arcuate section 20a of the conveyor belt 20, does not settle down thereon, but is maintained in a raised position and slightly tilted rearwardly in a manner previously described so that initial engagement with the lateral rim portion thereof by the can-engaging member 66 is experienced to instigate a tilting of this can C slightly to the left. Thereafter, the side of the can C adjacent the upper end thereof moves against the deflector bar 50 so that the tilting of the can is continued and the same gradually falls into the entrance end of the first twist chute 64. The can C is conducted along this twist chute 64 with a controlled turning or twisting to the left so that when it is discharged therefrom, it drops downwardly against the bottom 104 of the discharge chute 86 in merging relationship with the cans delivered from the other twist chute 90, as previously described. Since each can in the first chute 64 has been rotated 90° to the left while each can in the second chute 90 has been rotated 90° to the right, a relative twisting of the cans of 180° has been obtained so that the cans C are automatically oriented with their key ends all directed toward the same side of the discharge chute 86, to the right as viewed in the direction of travel of the cans in the structure illustrated in FIGS. 1 through 5.

If cans of different diameter and/or height are to be handled by the apparatus, the feed chute 10 is replaced by another chute specifically dimensioned to handle that new size of can, such feed chutes being commonly available in the standard can sizes.

The remainder of the apparatus can be readily adjusted to accommodate the new size of cans. First, the can guides 42 extending longitudinally of the conveyor belt 20 are moved laterally if the can diameter has been changed. The disposition of the can-engaging member 66 can be adjusted laterally or vertically to achieve proper engagement with the upper rim of the new size can and the deflector bar 50 also adjusted to achieve the desired engagement therewith.

The twist chutes 64, 90 are capable of receiving cans of considerably different diameters without adjustment, but in order to accommodate cans of different lengths, the two end-engaging rods 80 and 92 are varied in their vertical disposition at the entrance ends of both chutes and all four end-engaging rods 80, 82, 92 and 94 are shifted laterally at the exit ends of the chutes through lateral shifting adjustment of the sides 100, 102 of the discharge chute 86, whereby, simultaneously, the size of the twist chutes 64, 90 as well as that of the discharge chute 86 are appropriately adjusted.

With the entire apparatus thus quickly adjusted to handle the different size cans, the operation thereof can be instigated in the manner previously described and the described results will again be obtained. It will, of course, be appreciated that the structure specifically illustrated in the drawings has limitations on the permissible adjustments, but obviously, in principle, there is no such limitation, an apparatus embodying the invention being capable of handling cans or other articles or a wide variety of sizes and shapes.

Furthermore, while the apparatus has been described in connection with the detection of the key end of a can and the subsequent sorting and orienting of cans in accordance with the results of such detection, it will be apparent that the apparatus even in its illustrated form can be utilized to handle other detecting, sorting, and orienting applications. For example, without any change whatsoever, the illustrated apparatus can be used to detect the open end of a can, one end of which has not been provided with a closure member. Quite obviously, a can passing through the apparatus with its open end down will settle more on the arcuate section 20a of the conveyor belt 20 than a can with its closed end in engagement with such belt; wherefore, the last mentioned can will be shifted to the left for discharge through the first twist chute 64 while the can with its open end down will be carried directly through the apparatus for delivery through the second twist chute 90 into the discharge chute 86, all of the cans arriving in such discharge chute 86 in identically oriented positions.

Additionally, while the apparatus has been primarily designed to enable the detection of the presence or absence of a certain shape characteristic of a can or other article within a recessed portion thereof, the apparatus can also be applied to the detection of the shape characteristic or characteristics of an article whereat the asymmetry or other shape characteristic to be ascertained lies on a flat, exposed face of the article. As one example, the raised seam found on certain cans can well be detected by the described apparatus with suitable adjustments provided, and thereafter, the cans can be sorted and/or oriented in accordance with the results of such detection.

There are certain articles where the detection and subsequent sorting or orienting cannot be achieved merely through the sensing of a particular shape characteristic; for example, there are paper containers having one end formed of paper and the other of thin steel so that no shape asymmetry is evidenced between the two ends and the only variance in the characteristics at the opposite ends of the article are in the composition of the material itself. In order to provide for the detection and subsequent sorting and orienting of such articles as these, a modified embodiment of the invention, as illustrated in FIG. 6, can be employed. It can as well be employed for the detection of articles wherein both the shape and material characteristics vary from one end to the other; and as shown in FIG. 6, the apparatus illustrated is applied to the detection of the key end of a can of the same general character as described in the application of the first embodiment of the invention.

With reference then to FIG. 6, there is shown an inclined feed chute 110 that is arranged to deliver cans C successively in abutting file relation to the entrance end of a conveyor, generally indicated at 112. This conveyor 112 includes a pair of endless belts 114, 116, each of which is trained around spaced pulleys 118, 120 and 122, 124 respectively, so that one flight of each of the two conveyor belts extends in spaced parallelism separated by an amount sufficient to accommodate the cans C in endwise abutment therebetween. The first two pulleys 118, 122 have sprockets 126, 128 mounted on the ends of their respective supporting shafts so that a single link chain 130 may be trained thereabout in a manner such that the pulleys 118, 122 rotate in opposite directions wherefore the parallel flights of the endless belts 114, 116 move in unison. The link chain 130 also engages an idler sprocket 132, a tensioning sprocket 134 of conventional design, and the sprocket 136 on the end of the shaft of a motor 138 that serves as the drive element for the apparatus.

In accordance with the present invention, the other two pulleys 120, 124 remote from the driven end of the conveyor 112 are positioned opposite one another and each incorporates a permanent magnet centrally thereof, as indicated at 140 and 142 respectively. Additionally, the pulleys 120, 124 are each formed of ferromagnetic material so that the rims constitute the pole pieces of the magnet, as indicated at 124a and 124b in FIG. 7. Thus, when a can C is brought between the two pulleys 120, 124 by conveyor belts 114, 116, a magnetic attractive force is exerted on both ends thereof. Consequently, if a greater amount of steel or other paramagnetic material is disposed at one end of a can than at the other, a greater attractive force will be exerted at this end and the can will tend to follow an arcuate path at the periphery of the respective pulley. A pair of chutes 140, 142 follow the two arcuate paths extending around the magnetic pulleys 120, 124 for a predetermined distance and subsequently extend tangentially therefrom. Thus, a can C deflected by either of the pulleys 120, 124 along the respective arcuate path will eventually move into one of the chutes 140, 142 so as to ultimately be separated from its magnetic attachment as the chute extends tangentially away from the pulley.

If the described apparatus has been energized, cans C delivered down the feed chute 110 will be fed in abutting relation between the conveyor belts 114, 116 to eventually arrive opposite the magnetic pulleys 120, 124 with the key end thereof directed either to the left or right. If the key K is disposed at the left end of the can C, a larger magnetic flux path is provided by this end of the can and it will be more strongly attracted to the left pulley 120 than the right 124 and will thus be diverted along the left-hand chute 140. On the other hand, if the key K is directed to the right, the can C will be diverted into the right-hand chute 142. As in the case of the first embodiment of the invention, each of the chutes 140, 142 effects a 90° turning of the cans C. Since the turning is in opposite directions, a relative rotation of 180° is accomplished and the cans C may be delivered from both chutes 140, 142 into a common discharge chute (not shown) in identically oriented dispositions.

It will be seen that the effectiveness of the described second embodiment is again dependent upon the arcuate configuration of the article engaging member, in this case, the magnetic pulley which operates to effect displacement of the articles (cans) from the predetermined path defined by the conveyor belts 114, 116, and to thereafter deflect the articles through either of the chutes 140, 142 dependent upon the magnetic characteristics of the article.

It will also be apparent that the magnetic apparatus, just described, can be conveniently arranged to provide for adjustment of the spacing of the conveyor belts 114, 116 and of the size of the feed and output chutes 110, 140 and 142 so that various size cans can be handled thereby without further modification.

Obviously other structural modifications and or alterations can be made while retaining the essential concepts of the present invention so that the described embodiments are to be considered as purely exemplary and not in a limiting sense; the actual scope of the invention is indicated by reference to the appended claims.

What is claimed is:

1. Apparatus for detecting a certain characteristic in an article which comprises means for moving the article along a predetermined path in a single axially-predetermined disposition, means disposed on opposite sides of said path for engaging the axially opposite ends of the moving article and for selectively displacing the article in one of two directions in response to the absence or presence of the certain characteristic thereof, said engaging means including two like, coplanar, circular members mounted for rotation about parallel axes on opposite sides of the article path, the curved edges of said circular members being formed by magnetic elements arranged to engage the opposite ends of a moving article therebetween and exert magnetic forces thereon extending radially relative to the axes of rotation of said circular members.

2. Apparatus for detecting a certain characteristic of an article in a recessed portion thereof which comprises a first pulley supported for rotation and having a lateral dimension less than the width of the recessed portion of an article and a radius of curvature such that the pulley periphery projects into the recessed portion of the article, a second pulley spaced from said first pulley and coplanar therewith, and means including a belt trained about said pulleys for supporting and moving the article along a predetermined path to said first pulley, said first pulley having belt-retaining rims of magnetic material and forming the pole pieces of a magnet.

References Cited in the file of this patent
UNITED STATES PATENTS

| | | |
|---|---|---|
| 880,144 | Johnson | Feb. 25, 1908 |
| 1,777,139 | Fitz Gerald et al. | Sept. 30, 1930 |
| 1,815,029 | Albertoli | July 21, 1931 |
| 1,886,896 | Nelson | Nov. 8, 1932 |
| 2,583,707 | Prickett | Jan. 29, 1952 |
| 2,584,526 | Albertoli | Feb. 5, 1952 |
| 2,714,439 | Prickett | Aug. 2, 1955 |
| 2,758,434 | Johnson et al. | Aug. 14, 1956 |
| 2,873,018 | Dudley | Feb. 10, 1959 |
| 2,873,841 | Smith | Feb. 17, 1959 |